United States Patent [19]

Miyakawa et al.

[11] Patent Number: 4,539,669
[45] Date of Patent: Sep. 3, 1985

[54] FRONT-LOADING RECORD PLAYER

[75] Inventors: Tsutomu Miyakawa; Junji Yamane; Masahiro Takagi; Tomoyoshi Arai; Haruhiko Tanaka; Yuji Morita; Satoshi Sakurai, all of Saitama, Japan

[73] Assignee: Pioneer Electric Corporation, Tokyo, Japan

[21] Appl. No.: 458,590

[22] Filed: Jan. 17, 1983

[30] Foreign Application Priority Data

Jan. 18, 1982 [JP] Japan .................................. 57-4845

[51] Int. Cl.³ .................... G11B 17/04; G11B 23/02
[52] U.S. Cl. ...................................... 369/75.2; 312/8; 369/77.1
[58] Field of Search ................ 369/75.2, 77.1; 312/8, 312/9, 10

[56] References Cited

U.S. PATENT DOCUMENTS 1,388,243  8/1921  Dragner et al. ................... 312/8
4,337,533  6/1982  Ando et al. ...................... 369/77.1

FOREIGN PATENT DOCUMENTS 683058  11/1952  United Kingdom ............... 369/77.1

Primary Examiner—Steven L. Stephan
Attorney, Agent, or Firm—Sughrue, Mion, Zinn, Macpeak, and Seas

[57] ABSTRACT

A front-loading record player comprises a slide base carrying thereon a turntable and movable back and forth with respect to a player cabinet; a driving cam including a front slant retainer section and a rear linear section, the linear section extending in parallel with the moving direction of said slide base and the driving cam being provided on said slide base; a guide cam including a front recess portion and a rear linear portion, the linear portion extending in parallel with the moving direction of the slide base and the guide cam being provided on the player cabinet; and a front door opening/closing drive member for opening and closing a front door of the player cabinet, the drive member being held between the driving cam and the guide cam. The front door opening/closing drive member and the front door are drivingly coupled to each other. The front door opening/closing drive member is driven back and forth and held between the front slant retainer section of the driving cam and the rear linear portion of the guide cam when the slide base is located behind a predetermined position whereas the front door opening/closing drive member is held at a standstill between the linear section of the driving cam and the recess portion of the said guide cam when the slide base is located in front of the predetermined position.

10 Claims, 40 Drawing Figures

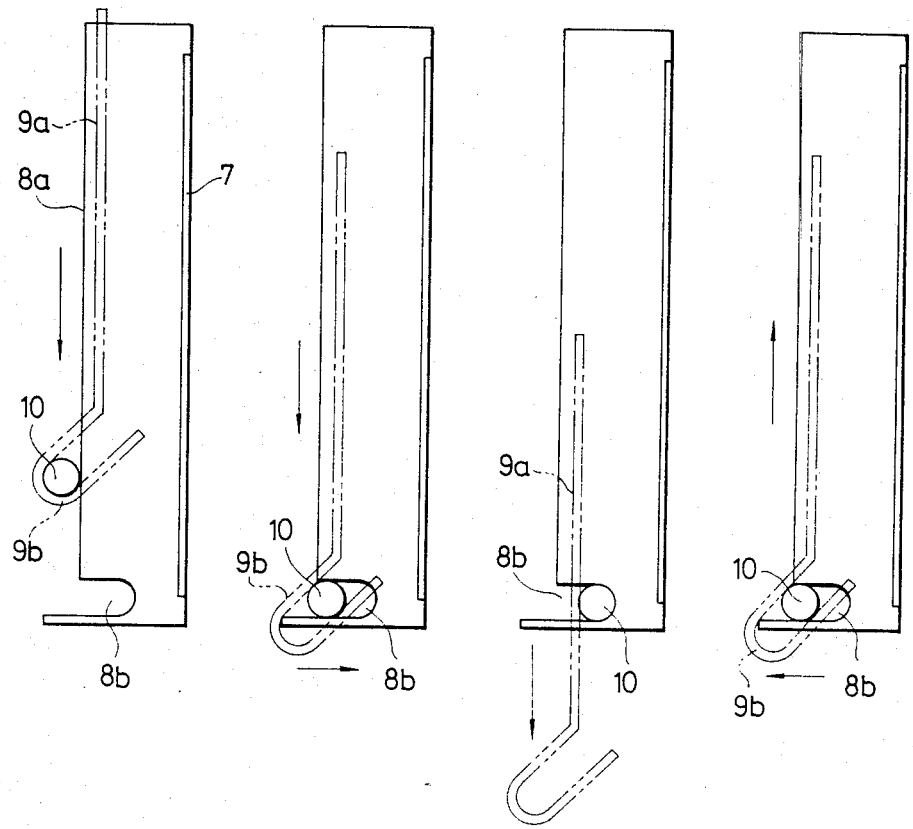

FRONT-LOADING RECORD PLAYER

BACKGROUND OF THE INVENTION

This invention relates to a front-loading record player.

A known record player is constructed so that its slide base, which thereon a turntable, is movable back and forth against a player cabinet and is moved forwardly by opening the front door in order to minimize the upper space required by the player cabinet. This also permits stereo equipment and the like to be mounted on the cabinet.

In such a record player, opening and closing of the front door is normally synchronized with the movement of the slide base to simplify the operation of the player. However, because the mechanism for driving the slide base is used to open and close the front door without providing an additional driving source for opening and closing the door, it is difficult to synchronize the interactions thereof, thus making the mechanism complicated and unreliable. Furthermore, it is difficult to provide a tone arm drive mechanism which is compact and suitable for such a slide base.

SUMMARY OF THE INVENTION

Accordingly, an object of the present invention is to provide a novel front-loading record player having a slide base mechanism and a compact tone arm driving and controlling mechanism suitable therefor, which overcome the above-noted defects.

This and other objects of the present invention are met by providing a front-loading record player comprising a slide base carrying thereon a turntable and movable back and forth with respect to a player cabinet; driving cam means including a front slant retainer section and a rear linear section, said linear section extending in parallel with the moving direction of said slide base and said driving cam means being provided on said slide base; guide cam means including a front recess portion and a rear linear portion, said linear portion extending in parallel with the moving direction of said slide base and said guide cam means being provided on said player cabinet; a front door opening/closing drive member for opening and closing a front door of said player cabinet, said drive member being held between said driving cam means and said guide cam means; and means for drivingly coupling said front door opening/closing drive member and said front door to each other, wherein said front door opening/closing drive member is driven back and forth and held between said front slant retainer section of said driving cam means and said rear linear portion of said guide cam means when said slide base is located behind a predetermined position whereas said front door opening/closing drive member is held at a standstill between said linear section of said driving cam means and said recess portion of said guide cam means when said slide base is located in front of said predetermined position.

According to the invention, a front-loading record player comprises: a slide base carrying thereon a turntable and movable back and forth with respect to a player cabinet; a slide lever; a front door opening/closing a front opening for said slide base; linking means for coupling said slide lever and said front door; guide groove means for guiding said front door, and means for drivingly cooperating said slide lever with said slide base so as to move said slide lever in a direction opposite to the moving direction of said slide base, said cooperating means including at least two gears coupled to each other through a safety joint.

According to other aspect of the invention, there is provided a front-loading record player comprising: a slide base carrying thereon a turntable and movable between a first position where said slide base is received in a player cabinet and a second position where a record disc may be mounted on said turntable, said second position being located behind said first position with respect to said player cabinet, means for positioning said slide base at a predetermined first position, at which said slide base is in contact with said positioning means, limit switch means actuated when said slide base is brought close to said first position, and a control circuit for controlling a drive motor of said slide base, an output of said limit switch means being coupled to said control circuit through a delay circuit. When said slide base is moved to said first position, said slide base is moved by said drive motor for a short period of time after said slide base actuates said limit switch means, and said slide base is stopped in contact with said positioning means.

Furthermore, according to the invention, there is provided a front-loading record player comprising: an index cam having an index member for contacting an outer periphery of a record disc mounted on a turntable, an assist lever frictionally engaging said index cam and provided coaxially with said index cam, said assist lever being displacable within a predetermined angle with respect to said index cam, a release lever abuttable against said assist lever so as to separate said index cam from said outer periphery of the record disc, a drive cam abuttable against said assist lever and said release lever and rotating a tone arm in the horizontal direction, and a rotatable drive unit carrying thereon a rotatable tone arm plate and said drive arm fixed thereto, wherein upon the rotation of said drive unit the drive cam drivingly rotates said assist lever, thereby leading-in said tone arm, and then rotates said release lever, thereby separating said index member from said outer periphery of the record disc.

BRIEF DESCRIPTION OF THE DRAWINGS

In the drawings:

FIGS. 4(a–d) are plan views of a mechanism for opening and closing a front door;

DETAILED DESCRIPTION OF THE PREFERRED EMBODIMENTS

Figure 1A:
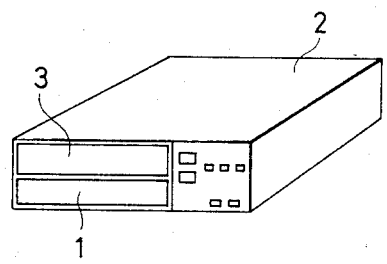
FIGS. 1(a) and 1(b) are perspective views of the present invention.

Referring now to the drawings, the present invention will be described in terms of an exemplary embodiment of the invention. FIGS. 1(a) and (b) are perspective views of the record player as a whole, illustrating a state in which a slide base is received in a player cabinet and another state in which a disc may be mounted on the slide base. A front door 3 is provided so as to cover an opening above the slide base in the front panel of a player cabinet 2, the front door being made freely movable between the vertical position shown in FIG. 1(a) and the horizontal position in the player cabinet shown in FIG. 1(b). All operating switches are congregated at the right front panel of the player cabinet, thus making it possible to turn the power supply on and off; open and close the door; start and stop a playing operation; manually position a record; shift the player RPM; and minutely govern the speed by using only this portion of the front panel.

Figure 1B:
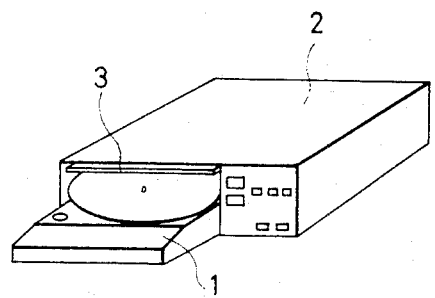
Figure 2:
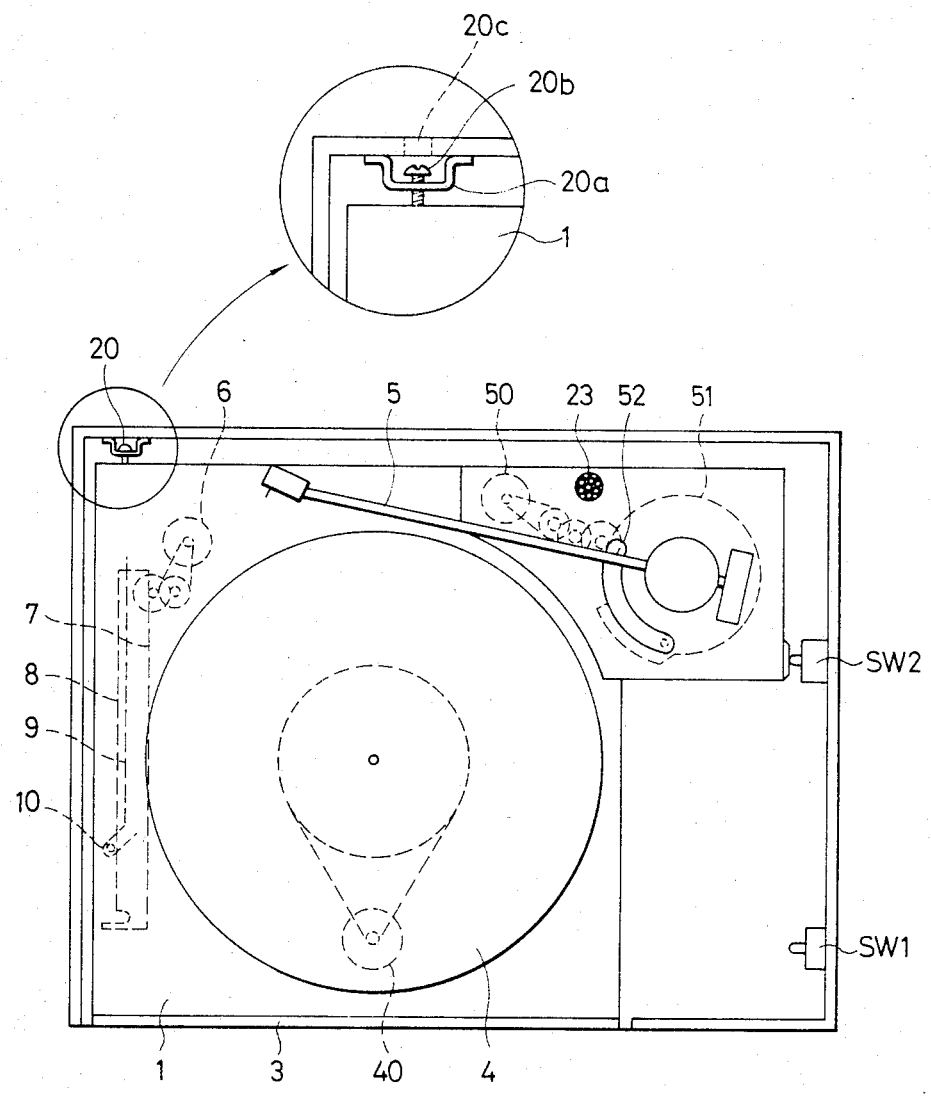
FIG. 2 is a plan view illustrating an internal mechanism when housed.

FIG. 2 is a plan view illustrating internal mechanisms in the cabinet. The slide base 1 carrying thereon a turntable 4 and a tone arm 5 is movable back and forth against the player cabinet 2 and is driven by a mechanism for driving the slide base between the retracted position shown in FIG. 1(a) and the record change position shown in FIG. 1(b). The mechanism for driving the slide base 1 includes a motor 6 provided on the inside of the slide base 1 and rotatable in either direction for driving the slide base; a reduction gear; a pinion; and a rack 7 provided on the base plate of the player cabinet and engaged with the pinion. The motor 6 for driving the slide base is started by the operation of the start/-stop switch and stopped by two limit switches SW1 and SW2 provided along the path of the movable slide base.

A positioning means 20 is provided on the rear panel of the player cabinet 2 and comes in contact with the rear end of the slide base. When the slide base 1 returns to the retracted position after the limit switch SW2 is turned off, its stop position is accurately controlled. Preferably, a delay circuit (not shown) is provided in the output circuit of the limit switch SW2 in such a way that power is supplied to the motor 6 for driving the slide base for a very short period of time (for instance, about 0.1 second) even after the switch has been turned off. Preferably, as shown in an encircled enlarged view, the positioning means 20 is arranged so that the tip of a cap screw 20b provided through a base 20a has a contact surface, the position of which may be adjusted through an aperture 20c (using a screwdriver) in the rear panel.

Figure 3:
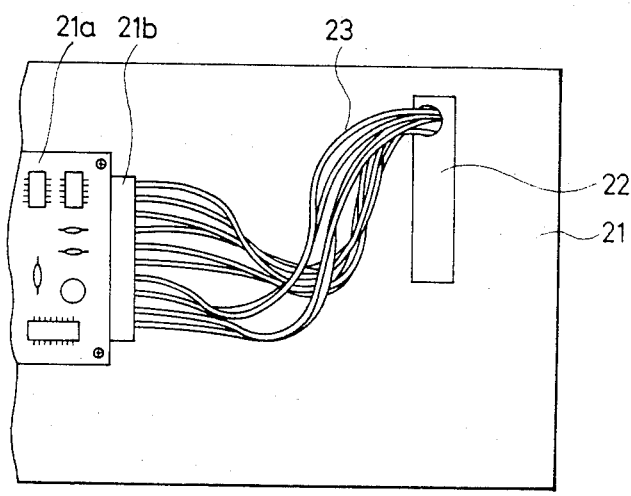
FIG. 3 is a plan view of a printed circuit board.

A board 21 for supporting a printed circuit board 21a provided with an electronic circuit for controlling actuation is placed under the ceiling of the player cabinet, a small space being alloted between the ceiling and the board 21. As shown in FIG. 3, a slit 22 is formed on the rear right of the board 21 in the moving direciton of the slide base. Leads for obtaining a pickup output from the slide base, various leads for control signals, leads for supplying power to the motor 6 for driving the slide base, a phonomotor 40, a motor 50 for driving and controlling the tone arm and so on are collectively (without being tied in a bundle) upwardly led through the slit 22 made in the board 21 for supporting the circuit and are introduced into the space provided between the ceiling and the board. These leads generally designated by 23 have been sufficiently slackened on the board 21 for supporting the circuit so that they can readily follow the slide base at it moves and the leads 23 are properly connected to the terminals of a connector 21b for the printed circuit board 21a. The tone arm 5 is driven and controlled by a driving unit 51 concentrically arranged under the tone arm and is moved to the position at the rear of the turntable shown in FIG. 2 except for during the play condition.

FIGS. 4(a) to (d) are plan views illustrating a driving assembly for opening and closing the front door. In FIG. 4(a), the slide base is housed in the cabinet. In FIG. 4(c), the slide base can allow a record to be mounted thereon. In FIGS. 4(b) or 4(d), the slide base is positioned halfway between the positions shown in FIGS. 4(a) and (c). The guide cam 8 made integral with the rack 7 fixed to the bottom of the player cabinet 2 and the driving cam 9 installed on the inside of the slide base 1 are employed to sandwich a driving pin 10 for opening and shutting the front door there-between, thereby driving the pin back and forth as the slide base moves. The guide cam 8 is composed of a linear section 8a and a concave section 8b formed at the front end of the linear section, while the driving cam 9 is composed of a linear section 9a and a holding section 9b formed in a sloped region at the front end of the holding section 9b.

When the slide base is housed or retracted in the cabinet as shown in FIG. 4(a), the driving pin 10 is held between the holding section 9b of the driving cam 9 and the linear section 8a of the guide cam 8, and the driving pin 10 is also driven in the forward direction as the slide base moves forwardly.

When the slide base moves up to the position shown in FIG. 4(b), the driving pin 10 contacts the front wall of the concave section 8b and stops thereat. When the slide base moves further forwardly, the holding section 9b moves along the slanted surface of the holding section 9b to the right and slips out of the holding section 9b, moving into the concave section 8b. Even if the slide base moves up to the position where a record may be mounted on it as shown in FIG. 4(c), the driving pin 10 will be held thereat.

When the slide base moves backwardly up to the position shown in FIG. 4(d), the driving pin 10 moves along the slanted surface of the holding section 9b to the left and escapes from the concave section 8b, again engaging the holding section 9b. The driving pin 10 is driven backwardly as the slide base moves. As a result, the slide base is again housed in the cabinet as shown in FIG. 4(a).

Figure 5A:
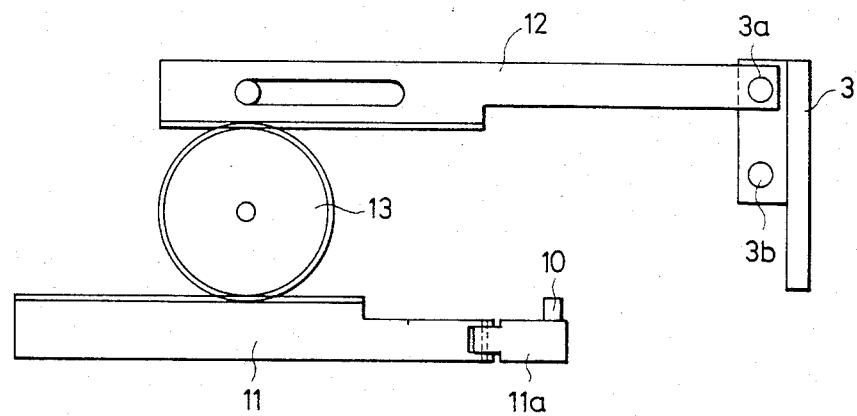
FIGS. 5(a), (b) and (c) are left side views of an interlocking driving pin for opening and closing the front door and the front door.
Figure 5B:
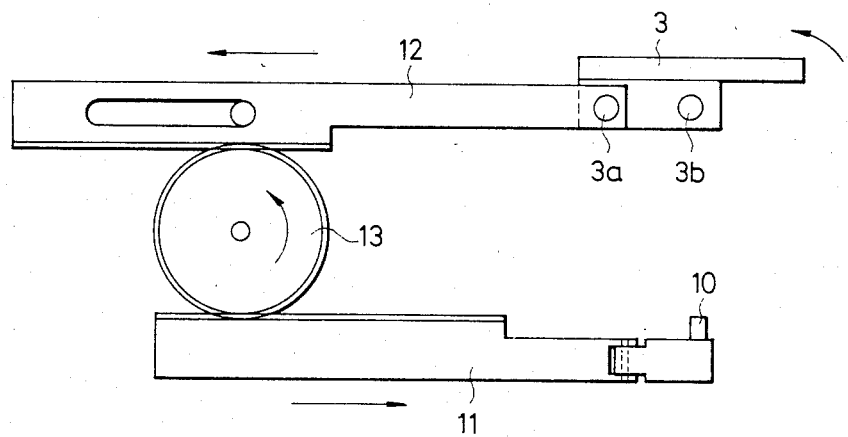

FIG. 5 is a left side view illustrating a mechanism for linking the driving pin 10 with the front door 3. Slide levers 11 and 12 are provided along the lefthand side wall as viewed from the front side of the player cabinet in such a way that they are movable back and forth and such that they are movable in the direction opposite to each other with a gear 13. The driving pin 10 is fixed to the front end of the lever 11a supported swingably in the horizontal direction by the slide lever 11.

Upper and lower guide pins 3(a) and 3(b) are provided on both sides of the front door 3 and the front end of the slide lever 12 is pivoted to the guide pin 3a on the lefthand side (as viewed from the front). When the driving pin 10 is driven in the forward direction as shown in FIGS. 5(a) and (b), the front door 3 is opened, whereas it is closed when the driving pin is driven in the backward direction.

Figure 5C:
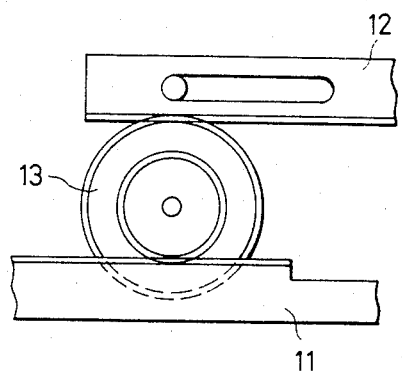

As shown in FIG. 5(c), if the gear 13 is formed of a large and small gear concentrically linked together, the opening and closing speed of the front door may be increased. At this time, if the two gears are linked together through a safety shaft joint such as a friction joint having engagement projections and associated recesses, the driving and linking mechanisms will not break down even when the front door movement is suppressed by, for example, the hand.

Figure 6:
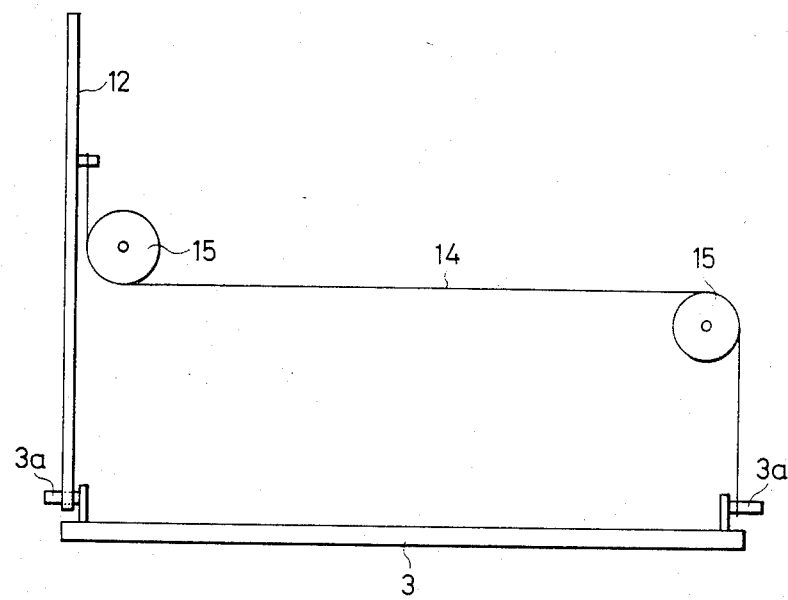
FIG. 6 is a plan view of an interlocking slide lever and the front door.

One end of a wire 14 is fixed to the middle of the slide lever 12 and the other end is, as shown in FIG. 6, fixed to the upper guide pin 3a on the right as viewed from the front side of the front door 3 through two regular pulleys provided on both sides of the ceiling of the player cabinet. Accordingly, when the front door is opened (that is, when it is moved from the vertical position covering the front plane of the player cabinet to the horizontal position in the player cabinet), both sides of the narrow, slender door to the right and left are moved together without being twisted.

Figure 7A:
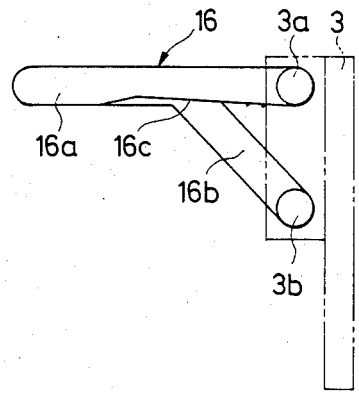
FIGS. 7(a), (b) and (c) are side views of a guide groove provided on the left wall.

FIGS. 7(a), (b), (c) and 8(a), (b), (c) show guide grooves for supporting the upper and lower guide pins. FIG. 7 shows the guide groove made on the inside of the lefthand wall and viewed from the outside, whereas FIGS. 8(a), (b) and (c) show the guide groove made on the inside of the righthand wall as viewed from the inside. Each guide groove 16 comprises a horizontal section 16a and a slant section 16b branching downwardly from the middle of the horizontal section and extending forwardly, and a plate spring 16c for direction control is provided to cover the upper end of the slant section.

Figure 8A:
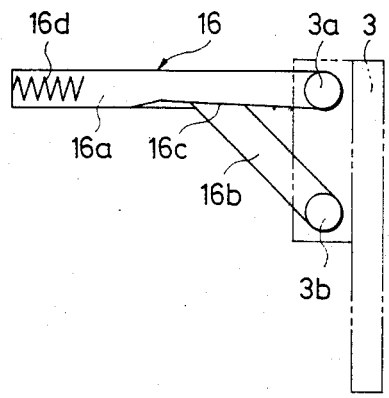
FIGS. 8(a), (b) and (c) are side views of a guide groove provided on the right wall.

When the front door 3 is closed (in the vertical position), the upper guide pin 3a and the lower guide pin 3b are, as shown in FIGS. 7(a) and 8(a), allowed to engage the front ends of the horizontal section 16a and the slant section 16b, respectively.

Figure 7B:
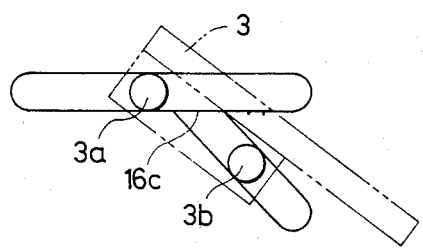
Figure 8B:
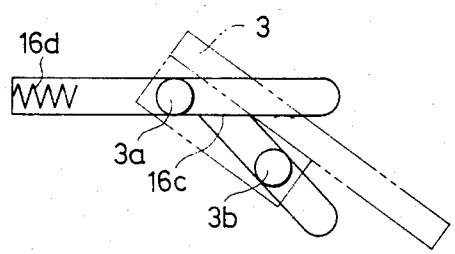
Figure 7C:
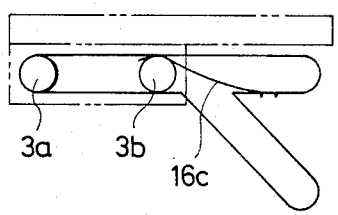
Figure 8C:
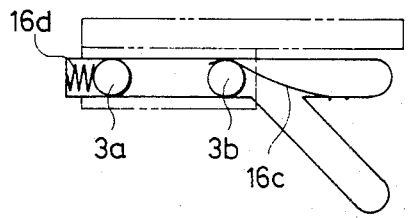

When the slide lever 12 moves backwardly to move the upper guide pin 3a in the backward direction, the upper and lower guide pins 3a and 3b are, as shown in FIGS. 7(b) and 8(b), forced to move backwardly. The front door 3 is lifted while being turned backwardly and inwardly opened (in the horizontal position) as shown in FIGS. 7(c) and 8(c). At this time, the plate spring 16c is held down by the guide pin 3b. When the slide lever 12 is subsequently moved forwardly, causing the front door 3 to shift its position from opening to closing, the lower guide pin 3b is guided by the plate spring 3c and led to the slant section 16b.

After the lower guide pin 3b has passed the junction, the plate spring 16c, as shown in FIGS. 7(b) and 8(b), drops to cover the upper end of the slant section 16b. When the upper guide pin 3a is subsequently about to pass the junction, it is guided along the horizontal section 16a in the forward direction.

The guide groove 16 made in the righthand wall is arranged as shown in FIGS. 7(c) and 8(c) so that the rear end of its horizontal section 16a is slightly elongated and so that a spring 16d is provided in this section. As shown in FIGS. 7(c) and 8(c), when the front door 3 is closed, the upper guide pin 3a is made to contact the spring 16d and is energized in the forward direction.

The upper guide pin 3a on the right of the front door is pulled in the backward direction by the wire 14 only when it is opened, whereas no force acts on the pin when the front door is being closed. Consequently, the energizing force of the spring 16d pushes the upper guide pin 3a forward and prevents the right end of the front door from moving too slowly. If the front door is slightly pushed, causing the lower guide pin 3b to enter the slant section 16b, the dead load of the front door will generate a force which allows the door to be closed. Accordingly, the energizing force of the spring 16d is required to work over only a short distance.

Figure 9A:
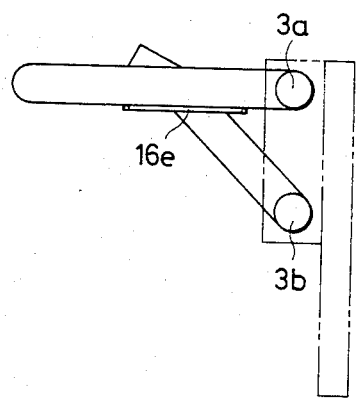
FIGS. 9(a), (b) and (c) are side views of another example of a member for directional control.

FIGS. 9(a), (b) and (c) show another example of a member for directional control, wherein a plate member 16e, in place of the plate spring 16c is supported in such a manner that it can oscillate upward and downward and its dead load is employed to cover the upper end of the slant section 16b.

FIGS. 10(a) to (c) and 11(a) to (c) also illustrate other examples of structures for supporting the front door with simple direction control means for the guide grooves.

Figure 10A:
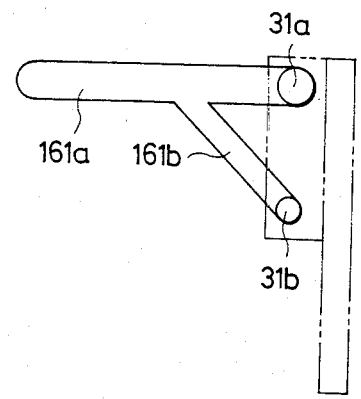
FIGS. 10(a), (b) and (c) are side views of another example of a guide groove.
Figure 9B:
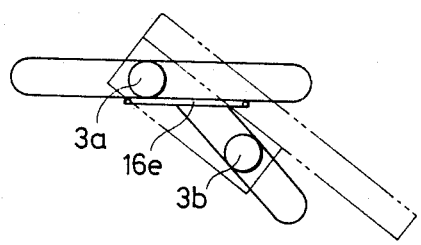
Figure 10B:
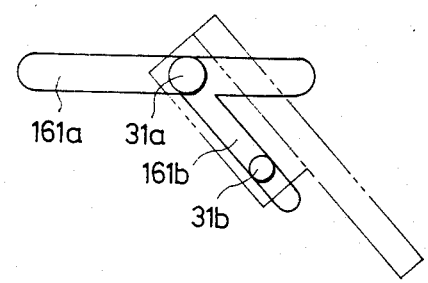
Figure 9C:
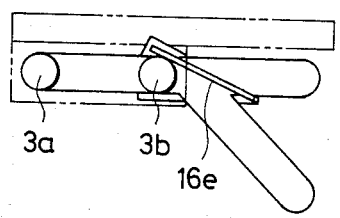
Figure 10C:
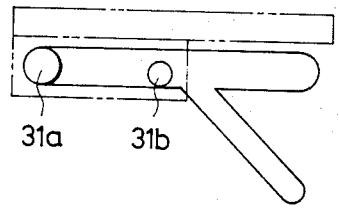

In the case of the structure shown in FIGS. 10(a) to (c), the diameter of the lower guide pin 31b of the front door is made smaller than that of the upper guide pin 31a, while the width of the slant section 161b is made smaller than the diameter of the upper guide pin 31a. As a result, the upper guide pin 31a is prevented from entering the slant section 161b as shown in FIG. 10(b).

When the front door 3 is moved forwardly from the position where it has been closed as shown in FIG. 10(c), the lower guide pin 31b changes its direction on passing the junction toward the slant section 161b because of the dead load of the front door, and the upper guide pin 31a continues to proceed along the linear section 161a to reach the position shown in FIG. 10(a).

Figure 11A:
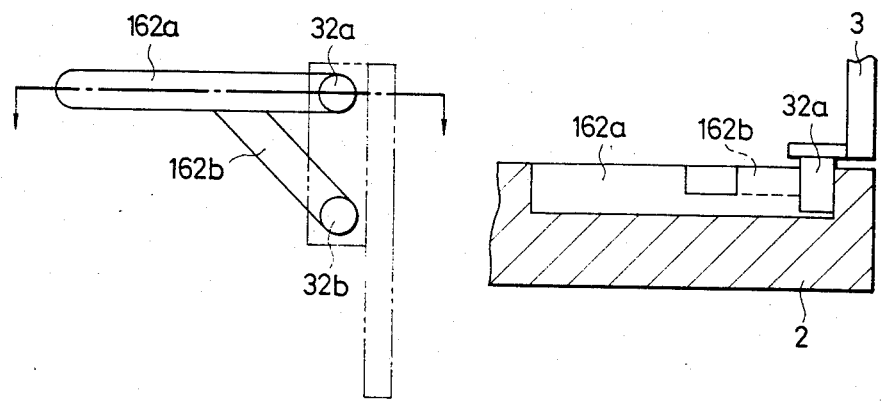
FIGS. 11(a), (b) and (c) are side and horizontal cross sectional views of another example of a guide groove.
Figure 11B:
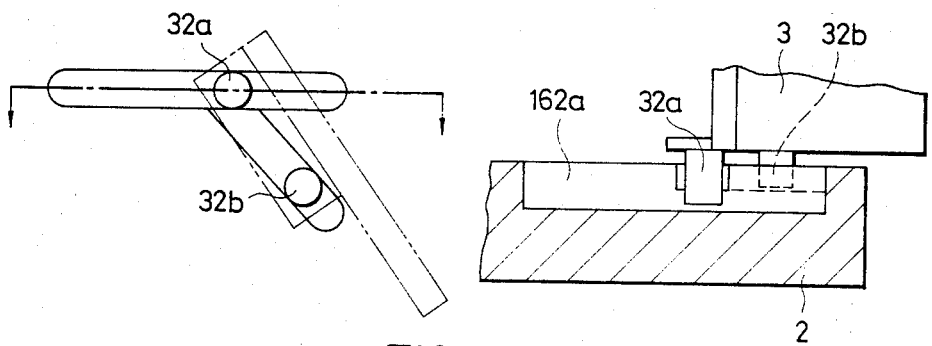
Figure 11C:
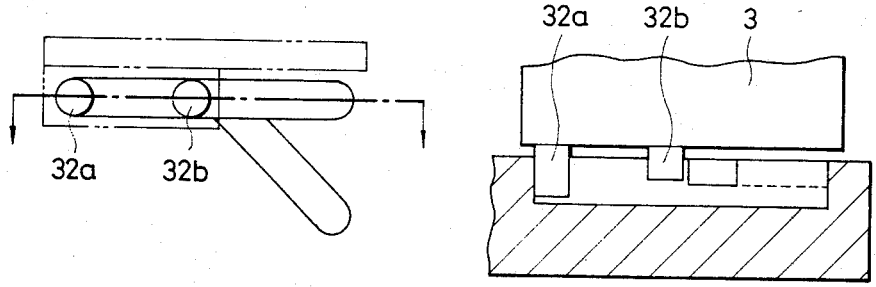

As shown in FIGS. 11(a) to (c) indicating side views and horizontal cross sections on the right side, by making the length of the lower guide pin 32b shorter than that of the upper guide pin 32a and by making the depth of the slant section 162b in the guide groove smaller than the length of the upper guide pin 32a, the slant section 162b of the upper guide pin 32a is prevented from entering into the slant section 162b of the upper guide pin 32a. The operation of this structure is the same as has been shown in FIGS. 10(a) to (c).

Figure 12A:
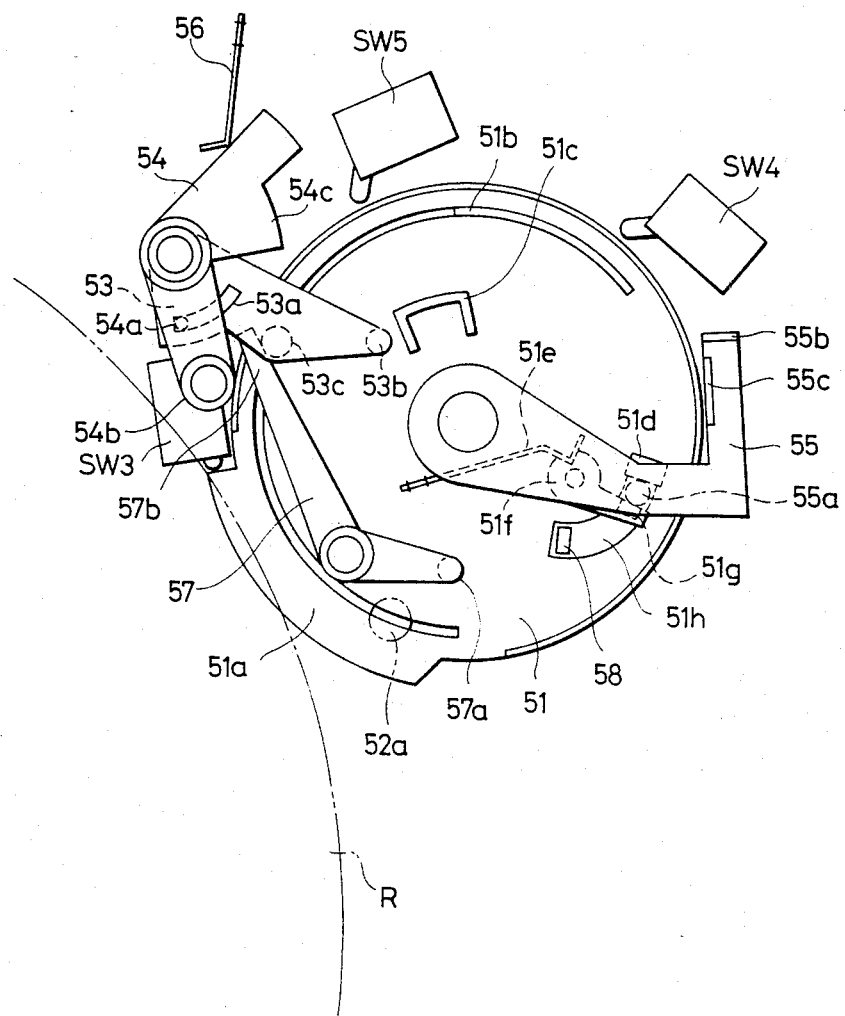
FIGS. 12(a), (b) and (c) are plan views of a mechanism for driving and controlling a tone arm.
Figure 12B:
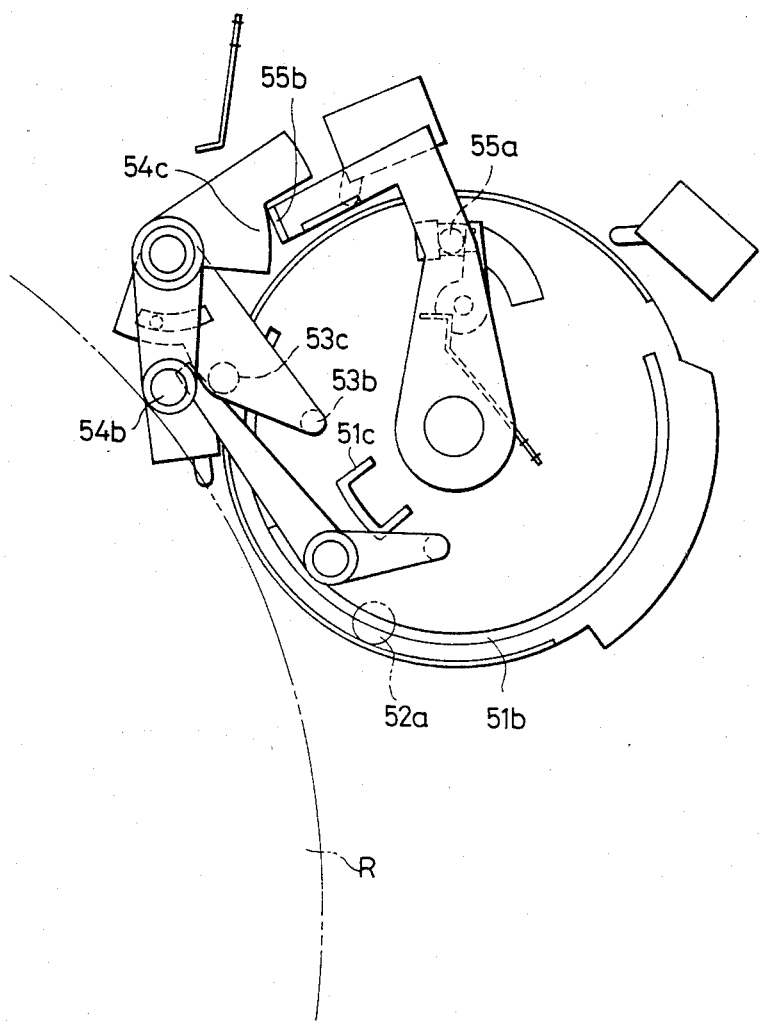
Figure 12C:
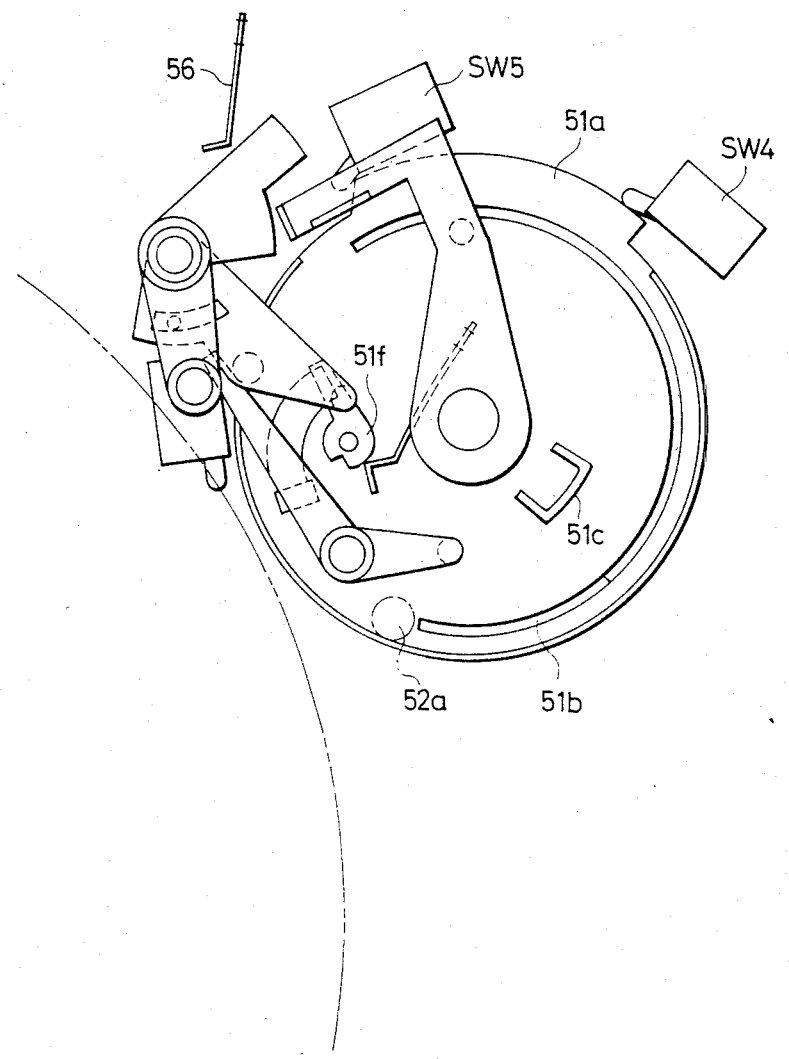

FIGS. 12(a) to (c) show plan views of a mechanism for controlling the movement of the tone arm, wherein (a), (b) and (c) illustrate that the tone arm 5 is in its rest position, above an entrance groove of a record disc of 30 cm in diameter, and on the groove, respectively.

A driving unit 51 provided on the bottom of the slide base is driven by a motor 50 (see FIG. 2) rotatable in both direction for driving and controlling the tone arm through a speed reduction mechanism. The driving unit also operates the limit switches SW3, SW4 and SW5 arranged on its periphery, using an operating cam 51a formed on its edge.

On the driving unit 51 is a circular cam 51b comprising horizontal and slanting sections for elevating the tone arm, a U-shaped driving cam 51c and a projection 51d. A lead-in latch 51f held by a click spring 51e in the position shown in FIG. 12 is rotatably supported on the drive unit 51. In addition, there is provided a circular arcuate aperture 51h through which a pin 51g projects from the undersurface of the end of the lead-in latch 51f.

The circular cam 51b for the arm lifter 51 (see FIG. 2) is formed over the rotational path of the tone arm 5 on the ceiling of the slide base, the lifter 52 being supported by a shaft 52a in such a manner that it is movable up and down. The lower end of the shaft 52a contacts the cam 51b of the driving unit for elevating the tone arm.

An assist lever 53 and an index cam 54 are attached coaxially and rotatably to the ceiling of the slide base. Due to friction, both of them engage each other, while an engagement pin 54a projecting from the lower surface of the index cam 54 is allowed to pass through an elongated circular aperture 53a provided in the assist lever 53. On the undersurface of the assist lever 53 is a driver pin 53b in contact with the driving cam 51c of the driving unit and a release pin 53c contacting a release lever 57 which will be described later.

An index pin 54b is provided on one end of the index cam 54 and is allowed to contact the external periphery of a record disc R (30 cm in diameter) mounted on the turntable 4. In addition, a step cam 54c comes in contact with a tone arm plate 55 to regulate its rotational position. A reset spring 56 is provided on the ceiling of the slide base 1 and is used to control the rotational position of the index cam 45 directly when the cam turns counterclockwise. A doglegged release lever 57 is provided on the ceiling of the slide base in such a way that is is rotatable. A pin 57a attached to one end of the release lever 57 contacts the driving cam 51c of the driving unit 51 and rotates, while the other end of the lever 57 contacts the release lever 53c of the assist lever 53 and turns the assist lever 53.

A pin 55a for driving the tone arm 5 projects from the undersurface of the tone arm plate 55 fixed to the horizontal rotating shaft of the tone arm 5. As the driving unit 51 turns counterclockwise, the tone arm driving pin 55a is held between the projection 51d and lead-in latch 51f and is made to turn with the driving unit 51 (lead-in). Even when the driving unit 51 turns clockwise, the driving pin is pushed by the projection 51d and is also made to turn with the driving unit 51 (lead-out).

A contact piece 55b contacting the step cam 54c of the index cam 54 and a detection piece 55c for optically detecting the fact that the tone arm has been introduced into the lead-out groove of the disc are provided at the end of the tone arm plate 55.

A projection piece 58 is provided on the bottom of the slide base 1 and is used to return the lead-in latch 51f to the position shown in FIG. 12(a) by contacting the pin 51g projecting from the undersurface of the lead-in latch 51f when the driving unit 51 turns to the position shown in FIG. 12(a).

FIG. 13 shows the relative actions of the assist lever 53 and the index cam 54. The actuation of the mechanism for driving the tone arm will be described with reference with FIGS. 12(a) to (c) and 13(a) to (f).

In the situation shown in FIG. 12(a), the tone arm 5 is in its rest position and the pin 55a for driving the tone arm 5 of the tone arm plate 55 is held between the projection 51d and the lead-in latch 51f of the driving unit 5, whereas the shaft 52a of the arm lifter 52 is made to contact the plane of the cam 51b for elevating the tone arm 5.

When the motor 50 for driving and controlling the tone arm 5 is started using the start/stop switch installed on the front panel of the player cabinet, the driving unit 51 turns counterclockwise and the driving cam 51c contacts the driven pin 53b of the assist lever 53, causing the assist lever 53 and the index cam 54 engaged by friction, to turn clockwise.

Figure 13A:
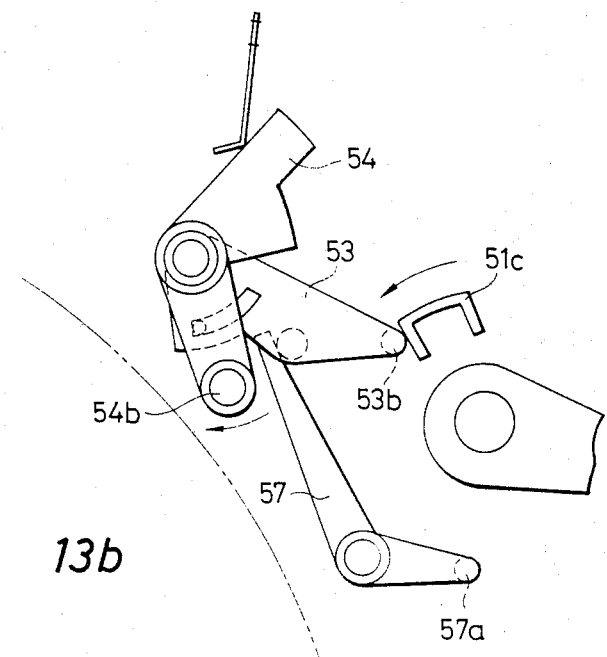
FIGS. 13(a) to (f) are plan views illustrating the relative actions of an assist lever and an index lever.
Figure 13B:
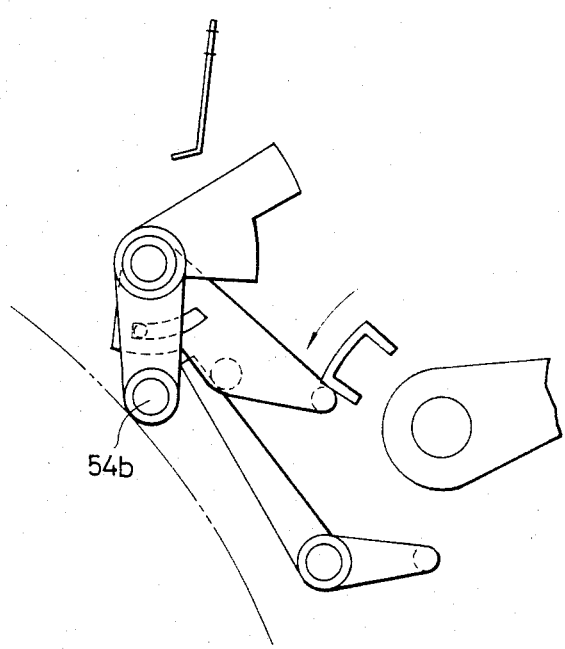
Figure 13C:
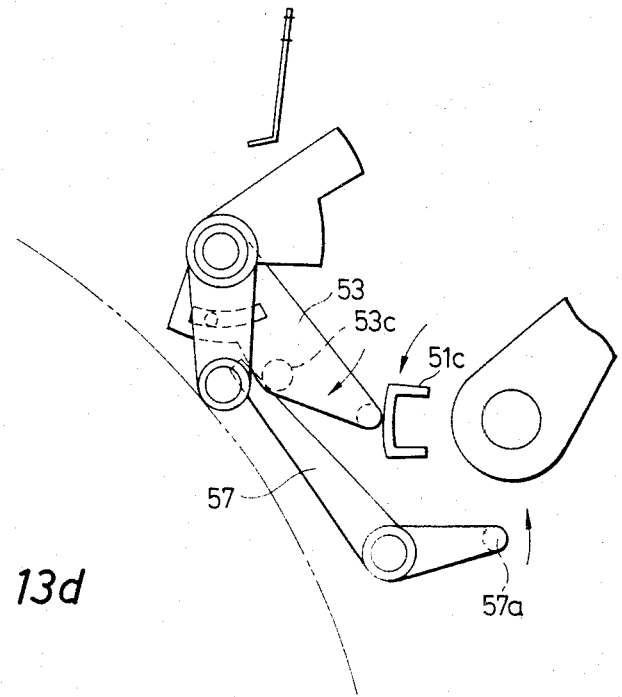
Figure 13D:
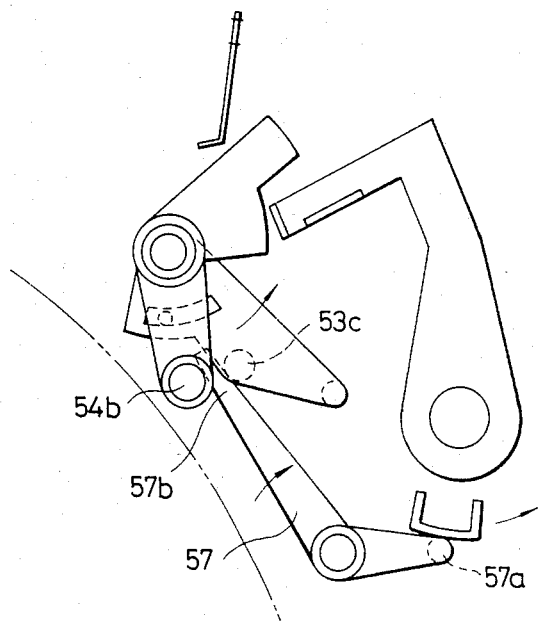

At this time, if a record disc of 30 cm in diameter is mounted on the turntable 4, the index pin 54b will contact the circumstance of the record disc as shown in FIG. 13(b), causing the index cam to stop. As shown in FIG. 13(c), only the assist lever 53 will continue to turn and the driving pin 53b will be released from the path of the driving cam 51c in order to stop.

In the meantime, the release lever 57 comes into contact with the release pin 53c of the assist lever 53 and turns counterclockwise, causing the pin 57a provided at one end of the lever 57 to join the locus of the driving cam 51c.

When the driving unit 51 turns further and the tone arm 5 turns to the position above the lead-in groove of the record disc R, the contact piece 55b of the tone arm plate 55 contacts, as shown in FIG. 12(b), the small diameter portion of the step cam 54c of the index cam 54 and stops. In the case of a record disc of 25 cm in diameter, the contact piece 55b will contact the large diameter portion of the step cam 54c because the index cam 54 has turned clockwise further.

Figure 14A:
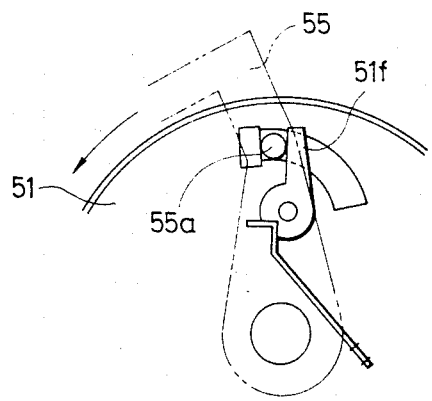
FIGS. 14(a) and (b) are plan views illustrating the operation of a lead-in member.
Figure 14B:
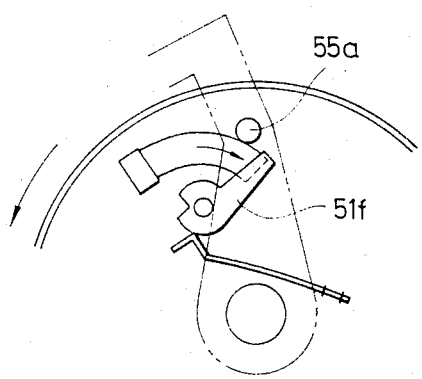

When the driving unit 51 further turns, as shown in FIGS. 14(a) and 14(b), the lead-in latch 51f is pushed by the pin 55a and is made to turn clockwise, releasing the pin 55a to free the tone arm 5.

Subsequently, the driving cam 51c turns the release lever 57 clockwise, whereas the end 57b of the release lever 57 contacts the release pin 53c of the assist lever 53, turning the assist lever 53 and the index cam 54 counterclockwise, and separating the index pin 54b from the circumference of the record disc R.

The driving unit 51 turns further and the shaft 52a of the arm lifter 52 descends along the slanting section of the cam 51b for lowering the tone arm and then leaves the tone arm 5 on the lead-in groove. The operating cam 51a operates the limit switch SW5 at the position shown in FIG. 12(c) and stops the driving unit 51. Simultaneously, a mute switch (not shown) in the vicinity of limit switch SW5 is turned off, so that playing is commenced.

Figure 13E:
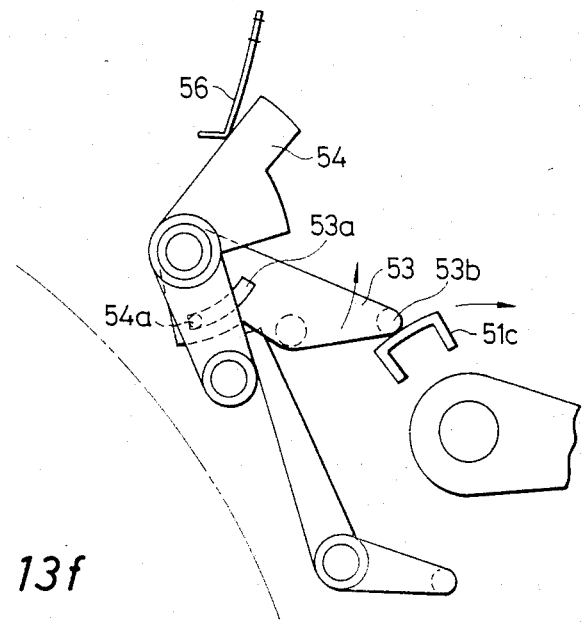
Figure 13F:
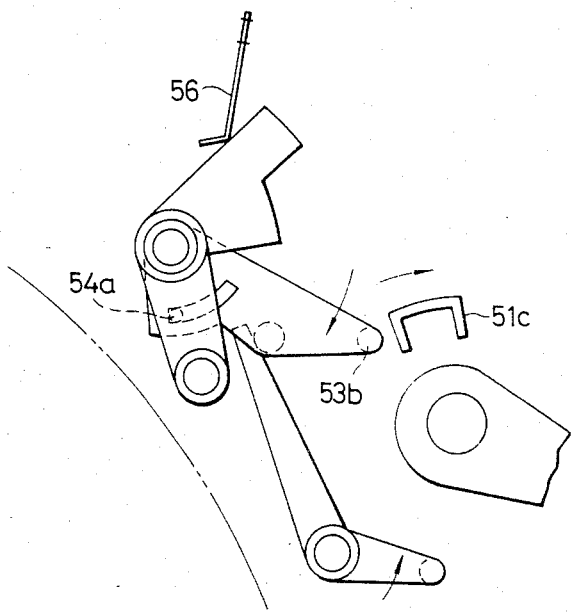

When the tone arm 5 approaches the lead-out groove of the record disc R during playing, the detection piece 55c provided on the tone arm plate 55 cooperates with a known end detection mechanism (not shown) and generates a signal indicating the end of the play to turn the driving unit 51 clockwise. When the driving unit 51 is turned clockwise, the shaft 52a of the arm lifter 52 first moves upwardly along the slanting surface of the cam 51b for elevating the tone arm, and subsequently, the projection 51d contacts the pin 55a to turn the tone arm 5 clockwise. As shown in FIG. 13(e), the driving cam 51c contacts the driven pin 53b of the assist lever 53 and turns the assist lever 53 and index cam 54 clockwise. The index cam 54 is brought into contact with and restricted by the reset spring 56. The pin 54a is pushed back to the position where it contacts the end of the elongated aperture 53a of the assist lever 53. The index cam 54 and the assist lever 53 are retained in this condition. When the driving unit 51 turns causing the driving cam 51c to be released from the driving pin 53b, the index cam 54 and the assist lever 53 are moved back to the reset position by the reset spring 56, as shown in FIG. 13(f).

When the driving unit 51 turns still further to the position shown in FIG. 12(a), the pin 51g of the lead-in latch 51f contacts a projection piece 58 provided on the bottom of the slide base 1 and turns counterclockwise to again hold the pin 55a for driving the tone arm. Then the end of the operating cam 51a operates the limit switch SW3 and stops the driving unit 51.

Figure 15A:
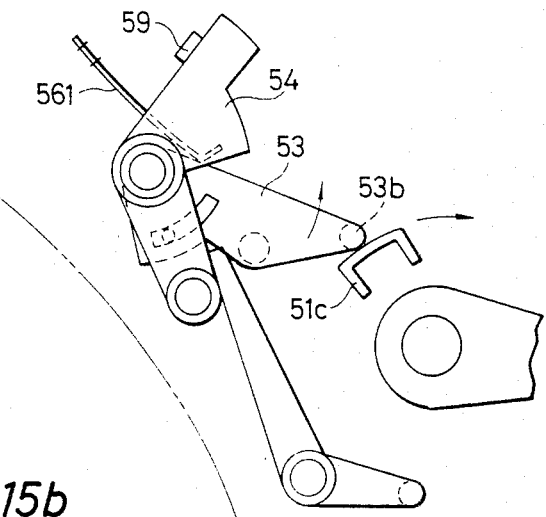
FIGS. 15(a) and (b) are plan views illustrating another example of a means for aligning an assist lever and an index lever.
Figure 15B:
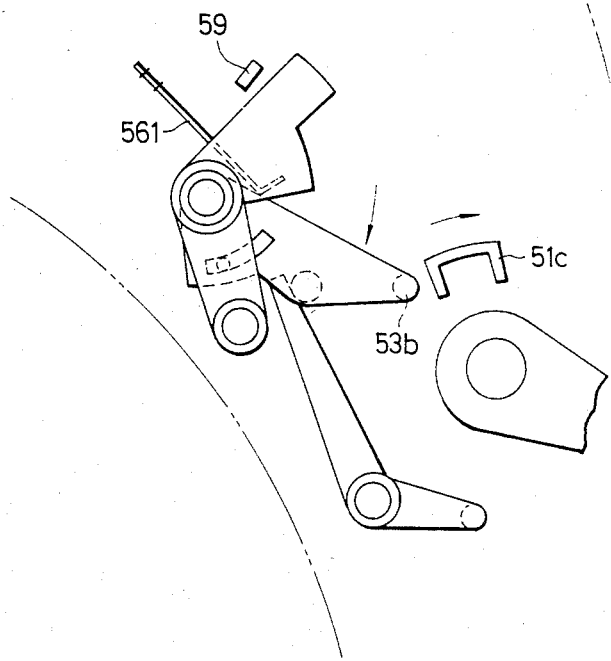

FIGS. 15(a) and (b) show another example of means for aligning the assist lever 53 and the index cam 54. This example includes a stop 59 for contacting the index cam 54 and a reset spring 561 fixed to the ceiling of the slide base 1. The assist lever 53 may be in contact with the assist lever 53. When the driving unit 51 turns clockwise and the driving cam 51c causes the assist lever 53 to turn to the position shown in FIG. 15(a) against the reset spring 561, the index cam 54 is brought into contact with the stop lever 59 and is retained in this condition engaging the assist lever 53. When the drive unit 51 turns further, as shown in FIG. 15(b), causing the driving pin 53b to disengage from the driving cam 51c, the assist lever 53 and the index cam 54 are returned together to the reset position by the reset spring 561.

The above described mechanisms operatively cooperate with each other as follows.

If the open/close switch is depressed when the slide base is received in the player cabinet as shown in FIG. 1(a), the slide base 1 will start moving forward and the front door 3 will be opened, so that the slide base 1 will move and then stop at the record changing/mounting position shown in FIG. 1(b).

If the start/stop switch is depressed after the record is put on the turntable 4, the slide base 2 will move to the retracted position and the front door 3 will be closed. Then the player plays the record automatically. After play has terminated (or a stop operation is performed), the tone arm returns to the rest position and stops. If the open/close switch is again depressed, the slide base 1 will move to the record changing/mounting position and stop thereat.

If the open/close switch is depressed after the record is removed, the slide base will move to the retracted position and the front door will be closed.

When the record player is manually operated, the record is mounted on the turntable at the record changing/mounting position. When the manual play switch is depressed, the tone arm moves forward while the slide base 1 is kept at a standstill and stops at the position above the lead-in groove. (The driving unit 51 is left at the position where the operating cam 51a has operated the limit switch SW4).

Accordingly, the position where the pickup is lowered is manually determined and the elevation switch is depressed. Then the tone arm descends at the desired position and returns to the rest position after play has been completed.

If the elevation switch is depressed in the middle of a playing operation, the tone arm will rise and stop at that position.

When repeated playing is conducted, the repeat play switch is first turned on and the start/stop switch is depressed at the position where a record can be mounted. The slide base 1 then moves to the retracted position and continues playing until the repeated play mode is released by depressing the repeat play switch.

As described above, in the thus constructed front-loading record player according to the present invention, the mechanism for opening and closing the front door comprises a driving pin for opening and closing the front door which is held between a driving cam provided in the slide base and the guide cam provided in a player cabinet. The driving pin for opening and closing the front door is driven back and forth to open and close the front door when the slide base is located between the position where the slide base is housed and the predetermined position slightly ahead thereof; whereas the driving pin is stopped to keep the front door open when the slide base is ahead of the predetermined position. Accordingly, the front door may be opened and closed timely and accurately in cooperation with the movement of the slide base, and the required mechanism is simple in construction and of high reliability.

What is claimed is:

1. A front-loading record player comprising:
   a slide base (1) carrying thereon a turntable (4) and movable back and forth in a direction with respect to a player cabinet, said player cabinet having a front door;
   driving cam means (9) including a front slant retainer section (9b) and a rear linear section (9a), said linear section extending in parallel with the moving direction of said slide base and said driving cam means being provided on said slide base;
   guide cam means (8) including a front recess portion (8b) and a rear linear portion (8a), said linear portion extending in parallel with the moving direction of said slide base and said guide cam means being provided on said player cabinet,
   a front door opening/closing drive member (10) for opening and closing said front door (3) of said player cabinet, said drive member being held between said driving cam means (9) and said guide cam means (8); and
   means (11, 12, 13) for drivingly coupling said front door opending/closing drive member (10) and said front door to each other,
   wherein said front door opening/closing drive member (10) is driven back and forth and held between said front slant retainer section of said driving cam means (9) and said rear linear portion of said guide cam means (8) when said slide base (1) is located behind a predetermined position whereas said front door opening/closing drive member (10) is held at a standstill between said linear section of said driving cam means (9) and said recess portion of said guide cam means (8) when said slide base (1) is located in front of said predetermined position.

2. The record player of claim 1, further comprising guide means for guiding the movements of said front door (3), and said coupling means (11, 12, 13) including a slide lever (12), whereby said slide lever (12) is moved in compliance with the movement of said slide base (1) and is guided by said guide means.

3. The record player of claim 2, said guide means including a pair of upper guide pins (3a) and a pair of lower guide pins (3b) formed at upper and lower portions of both sides of said front door (3), respectively, and a pair of guide grooves guiding the movements of said upper and lower guide pins (3a, 3b), each of said guide grooves (16) including a horizontal portion (16a) and a slant portion (16b) which is branched downwardly midway of said horizontal portion (16a), said upper and lower guide pins (3a, 3b) being slidingly engaged with said horizontal portions and said branched slant portions, respectively, said guide groove being formed on both sides of side walls of said player cabinet, whereby said front door (3) is guided to move said upper guide pins (3a) along said horizontal portions (16a) and to move said lower guide pins (3b) along said slant portions and said horizontal portions (16a) whereby said front door (3) is moved a first position where said front door is retracted in the interior of said player cabinet and retained substantially in a horizontal condition and a second position where said front door is retained substantially in a vertical condition to cover the front opening of said player cabinet.

4. The record player of claim 3, said guide means further including directional control means (16c, 16e) for ensuring the movements of said upper guide pins (3a) along said horizontal portions and the movements of said lower guide pins from the branched portion to the slant portions.

5. The record player of claim 4, said directional control means including leaf spring (16c) of which front ends are fixed in front of the branched portion.

6. The record player of claim 4, said directional control means including planar rigid members (16e) of which front ends are fixed in front of the branched portion.

7. The record player of claim 3, in which a width of said horizontal portion (161a) of said guide means is greater than that of the slant portion (161b) of said guide means, and in which a diameter of said upper guide pin (31a) is greater than that of the lower guide pin (31b).

8. The record player of claim 3, in which a projecting length of said upper pin (32a) is longer than that of said lower pin (32b), and a depth of said horizontal portion (162a) of said guide means is greater than that of said slant portion (162b) of said guide means.

9. The record player of claim 1, said means for drivingly coupling said front door opening/closing drive member (10) and said front door (3) to each other further including a slide lever (12), a wire (14) and wheels (15), one end of said slide lever (12) being coupled to an upper pin (3a) fixed to one side of said front door (3) and said wire being coupled at one end to an intermediate portion of said slide lever (12) and at the other end to another upper pin (3a) fixed to the other side of said front door (3).

10. The record player of claim 9, said guide means including at a rear end of said horizontal portion a spring member (16d) for urging said front door (3) forwardly on one side, said another guide pin being coupled to the wire (14).

* * * * *